Aug. 15, 1967   E. C. MERSEREAU ET AL   3,335,825
BRAKE MECHANISM
Filed April 27, 1965   2 Sheets-Sheet 2
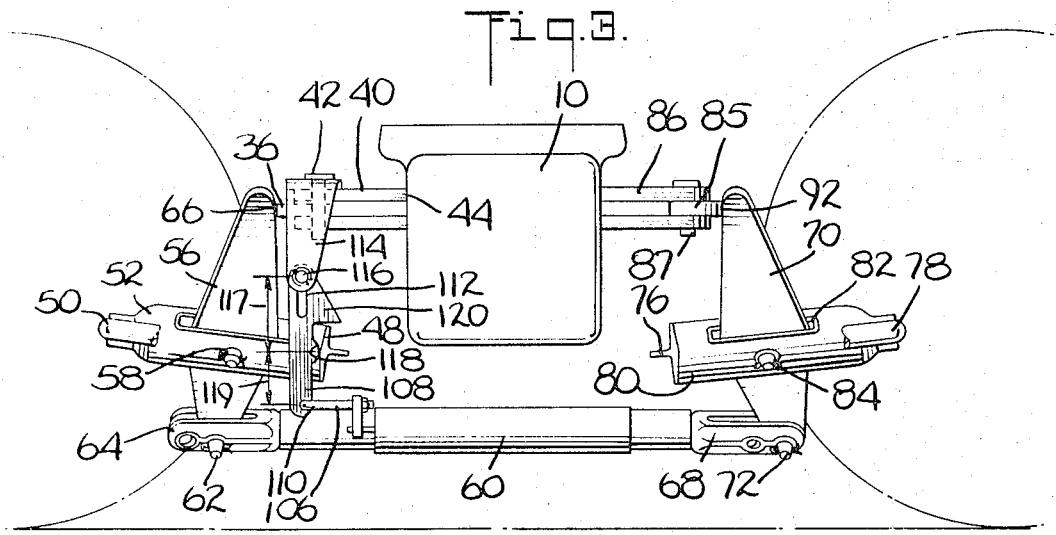
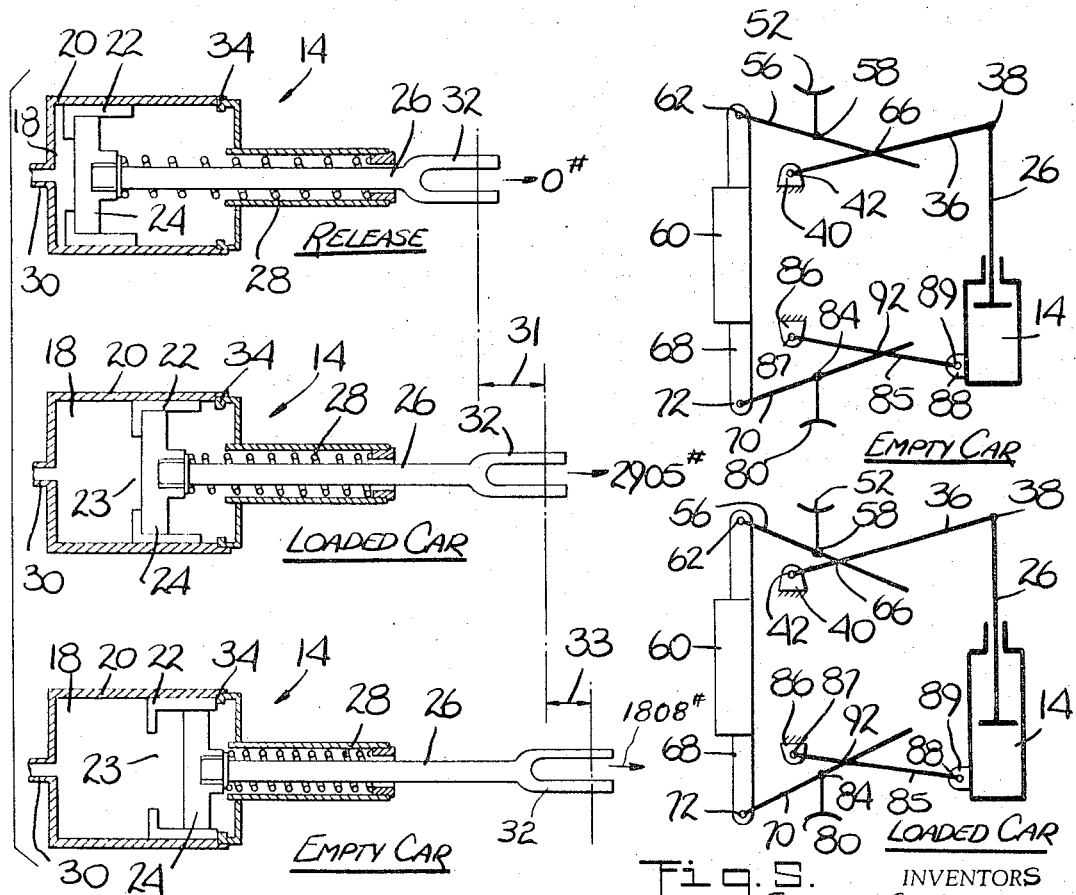
INVENTORS
EVERARD C. MERSEREAU
ROBERT M. HOLLOWAY
ROBERT L. LUDINGTON
ATTORNEYS United States Patent Office 3,335,825
Patented Aug. 15, 1967

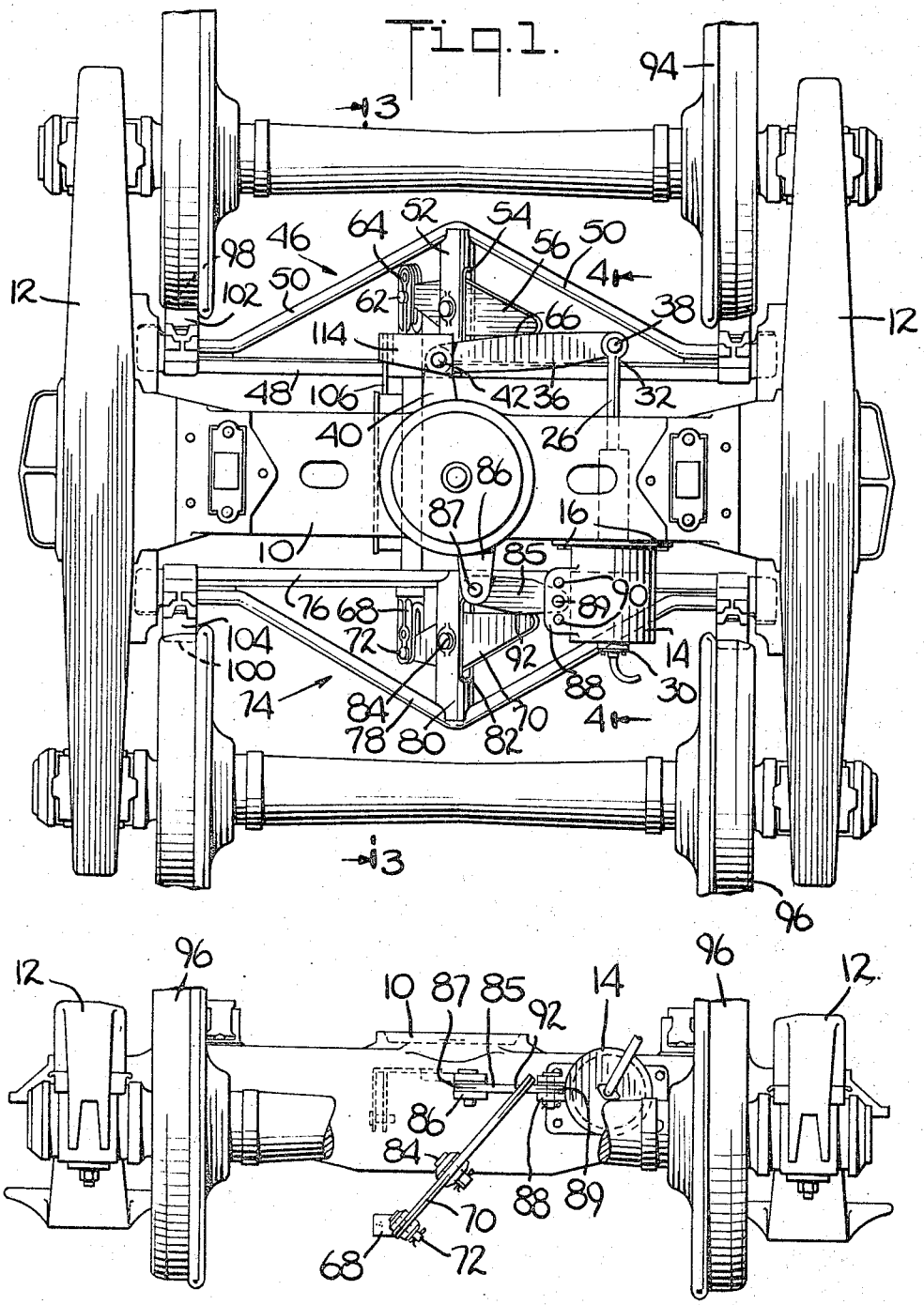

3,335,825
BRAKE MECHANISM
Everard C. Mersereau, Westfield, N.J., and Robert M. Holloway, 408 Springland Ave., and Robert L. Ludington, Stop 34, Duneland Beach, both of Michigan City, Ind. 46360; said Mersereau assignor, by mesne assignments, to said Holloway and said Ludington
Filed Apr. 27, 1965, Ser. No. 451,280
21 Claims. (Cl. 188—195)

This application is a continuation-in-part of application Ser. No. 398,247 filed Sept. 22, 1964 for Brake Mechanism, now U.S. Patent No. 3,298,475.

This invention has to do with brake mechanisms and, more particularly, empty and load brake mechanisms for standard railway cars.

The brake mechanism according to this invention is particularly adapted for use on all standard railway car trucks such as are now widely in use on American, Mexican and Canadian railways. The brake mechanism according to this invention may be used as new or original equipment on the railway cars, or it may be used as replacements or attachments to brake mechanisms presently in operation.

Heretofore, considerable difficulty has been experienced due to the fact that brake mechanisms constructed in accordance with the prior art concepts resulted in overbraking empty railway cars and under-braking loaded railway cars. It is an object of the present invention to overcome this difficulty which was inherent with prior art brake mechanisms.

An aim of this invention is to provide a new and improved brake adjusting mechanism which provides a variable braking force depending upon the load being carried by the car, which can be used with standard railway brake mechanisms, and which simplifies the brake mechanism.

A feature of this invention resides in the provision of a brake mechanism which increases the efficiency of the brake operation and which is reliable, compact, low in weight, convenient, practical, safe in operation and economical.

According to the invention, a first improvement includes the provision of means for increasing the braking force corresponding to an increase in the load being carried by the car by altering the leverage ratio of the levers which communicate the applied force to the brake shoes. A second improvement includes the provision of a compound fluid piston whereby the force acting on the piston rod is substantially greater when the railway car is loaded than when the car is empty. A third improvement resides in the provision of means for actuating the slack adjuster sooner when the railway car is loaded as compared to when the railway car is empty. It will be appreciated that the combination of the aforementioned three improvements contributes towards providing a highly desirable brake mechanism whereby loaded railway cars are not under-braked and empty railway cars are not over-braked. Also, each of the improvements when acting alone contribute towards achieving this desirable result. However, in order for the second improvement to be particularly effective, then it should be combined with the third improvement.

In brief, the present invention comprises the provision of a brake mechanism for frictionally engaging wheels of a railway car which comprises a frame member, means mounting said frame member for vertical movement, the vertical position being responsive to the load carried by said railway car, and a fluid cylinder mounted on the frame member carrying a piston rod actuated by a two stage variable diameter piston. That is to say, two relatively fixed piston travels and a variable piston diameter are employed depending upon whether the railway car is loaded or empty. A horizontal lever is provided having one end thereof pivotally mounted on the frame member and the other end thereof pivotally mounted on the piston rod. Brake shoes are disposed on opposite ends of a brake beam and they are brought into frictional engagement with the wheel treads of a pair of wheels carried by the railway truck. Centrally pivotally mounted on the brake beam is a truck live lever, and slack adjuster means are provided having a first end and a second end. The truck live lever is adapted to slidably engage the horizontal lever at a first variable contact point towards one end thereof and is pivotally connected to the first end of the slack adjusting means at the other end thereof, the position of said contact point being responsive to the vertical position of the frame member. A vertical lever is provided having the lower end pivotally attached to the slack adjuster means and the upper end having means for adjustably, pivotally interconnecting the frame member and the lever, the adjustment depending upon the vertical position of the frame member. The lever has a first projection for purposes of limiting its vertical travel with respect to the frame member, and it has a second projection for engaging the brake beam, whereby movement of the brake beam causes actuation of the slack adjuster.

Further, a second brake beam is provided having brake shoes mounted at the opposite ends thereof which are brought into frictional engagement with the wheel treads of a second pair of wheels mounted on the same railway truck. There is a horizontal dead lever, both ends of which being fixedly mounted with respect to the frame member. A truck dead lever is centrally pivotally mounted on the second brake beam and is pivotally connected at one end to the second end of the slack adjusting means. The other end of the truck dead lever is adapted for slidable engagement at a second contact point with the horizontal dead lever. The location of this point is responsive to the vertical position of the frame member, whereby the braking force transmitted to the brake beams is substantially greater when the railway car is loaded as compared to when the railway car is empty.

Other objects and advantages will be apparent from the following description of one embodiment of the invention, and the novel features will be particularly pointed out hereinafter in connection with the appended claims.

In the accompanying drawing:

FIG. 1 is a plan view of a railway car truck having a brake mechanism constructed in accordance with the concepts of this invention;

FIG. 2 is an end elevation of the railway car truck of FIG. 1;

FIG. 3 is a sectional view taken along the line 3—3 of FIG. 1, and showing the means for actuating the slack adjusting means;

FIG. 4 is a series of sectional views taken along the line 4—4 of FIG. 1 and showing the fluid piston means in three different successive positions; and FIG. 5 is a diagrammatic view showing the brake mechanism when the railway car is in its empty and full conditions.

In the illustrated embodiment of the invention, a standard conventional type railway car truck is shown having a resiliently or spring supported frame 10 including side frames 12.

There is a compound air piston cylinder assembly 14 (FIG. 1) which is fixedly attached to the frame 10 as by means of bolts 16. Referring to FIG. 4, there is shown three vertical sectional views of the assembly 14 in three different positions, i.e. viz., release position, loaded car position, and empty car position. The assembly 14 comprises a cylinder 18 having a cylinder wall 20 which is adapted to receive an outer piston sleeve 22 which, in turn, receives an inner piston 24 having a piston push rod 26, a coil spring 28 being surmounted on the piston push rod 26 for purposes of returning the piston 24 to the bottom of its stroke. A suitable source of air (not shown) is supplied to the air connection 30 of the cylinder 18 for actuating the pistons. A yoke 32 is provided at the end of rod 26 to facilitate connecting the assembly to the other levers as will be described more fully hereinafter.

Still referring to FIG. 4, the view of the assembly in the released position shows the inner piston 24, the outer piston sleeve 22 and the piston rod 26 in their far left position, due to the action of the coil spring 28. As pointed out hereinbefore, one of the objects of this invention is to provide a variable braking force depending upon the condition of the car, i.e. loaded or empty. Accordingly, the force produced by the assembly 14, as transmitted by the piston rod 26, is considerably greater for a loaded car as compared to an empty car. This is accomplished by using a short piston travel 31 on a loaded car in which case the air pressure bears against the outer piston sleeve 22 as well as the inner piston 24, thereby providing an effective piston area substantially equal to the entire area of the inside of the cylinder 18. When the railway car is empty, a long piston travel (the sum of lengths 31 and 33) is used, and in this case the outer sleeve 22 moves to the right as viewed in FIG. 4 until it is stopped by abutment 34, thereby permitting the air pressure to operate against the smaller effective area corresponding to the inner piston 24, resulting in a substantially lower operative force. It will be appreciated that the area of the opening 23 is less than the area of the outer piston sleeve 22 so that the outer piston sleeve 22 and the inner piston 24 will remain in engagement with each other when the railway car is loaded as shown in FIG. 4.

Reverting to FIG. 1, a horizontal lever 36 is pivotally mounted on the yoke 32 of the piston push rod 26 as by pin means 38. The other end of the lever 36 is pivotally attached to a support member 40 as by means of pin 42, the support member 40 being rigidly connected to the frame 10 as at 44 (FIG. 3). Referring again to FIG. 1, a brake beam or brake beam frame designated generally at 46 is provided and comprises a brake beam cross member 48, a pair of arms 50 and a medial strut 52, said strut being provided with an elongated slot 54 for receiving a truck live lever 56 which is pivotally connected thereto as by means of pin 58. One end of the truck live lever 56 is pivotally attached to an automatic slack adjuster 60 by means of a pin 62 and yoke member 64 as seen in FIGS. 1 and 3. The horizontal lever 36 is adapted to frictionally engage the truck live lever 56 at a point 66, FIGS. 1 and 3, which varies according to the railway car loading as will described more fully hereinafter.

As best seen in FIGS. 1 and 3, the other end of the slack adjuster 60 has a yoke member 68 depending therefrom for purposes of providing a connecting means with a truck dead lever 70 as by means of pin 72. A second brake beam 74 (FIG. 1) is provided with a cross member 76, a pair of arms 78, and a strut 80 having a slot 82 for receiving the truck dead lever 70 which is pivotally connected thereto by pin 84. As seen in FIGS. 1 and 2, a horizontal dead lever 85 is fixedly connected at 87 to a first support member 86, and is fixedly connected at 89 to a second support member 88, support member 86 being fixedly attached to the frame 10 and support member 88 being fixedly attached to the side of the air cylinder 14. It will be appreciated that the location of the horizontal dead lever 85 is adjustable by means of a series of holes 90 (FIG. 1) provided in the support member 88 in order to suit railway truck structure variations. A truck dead lever 70 (FIGS. 1 and 2) is adapted to contact the horizontal dead lever 85 at point 92 which varies according to the vertical position of the frame member in a manner similar to point 66 as will be described more fully hereinafter.

Referring to FIG. 1, the railway truck is provided with two pairs of interconnected wheels 94 and 96 having wheel treads 98 and 100, respectively, which are engaged for braking purposes by brake shoes 102 and 104 carried by the brake beams 46 and 74, respectively. The brakes are operated by means of applying air to the fluid cylinder assembly 14 which acts through the aforementioned linkage to apply the brake shoes against the wheels.

Reverting to FIG. 3, the automatic slack adjuster 60 may be of any suitable type, the slack adjuster described in detail in the aforementioned patent application Ser. No. 398,247 being particularly desirable. The slack adjuster is in effect a double acting device and serves to automatically maintain the piston rod travel at its first preselected amount when the car is empty and at its second preselected amount when the car is loaded, and hence the braking force is uniformly applied in each car of a series of cars. Thus, the possibility of some cars being held back while other cars roll ahead is substantially eliminated. In operation, when the brakes are applied by adding air to the cylinder, the slack adjuster initially extends or retracts to eliminate the slack and control the travel of the brake mechanism, and thence as the brakes are further applied the slack adjuster acts as a rigid elongated bar interconnecting the truck live lever and the truck dead lever. The slack adjuster is actuated by means of a trigger 106 slidably mounted on a portion of the housing of the slack adjuster 60, and pivotally connected to the one end of a veritcal lever 108 at 110, the other end of the lever 108 being provided with a slot 112. A supplementary bracket or support 114 is permanently affixed to bracket 40 and pivot pin 116 pivotally connects the support 114 and the vertical lever 108 through the slot 112. Lever 108 is provided with a projection 118 (FIG. 3) for actuation of the slack adjuster while maintaining a horizontal relationship between the lever 108 and the slack adjuster 60. The vertical distance 117 between the pin 116 and the projection 118 constitutes a lever arm for the brake beam force applied at projection 118 and the vertical distance 119 between the projection 118 and the pivot point 110 constitutes a second lever arm for the trigger actuating force. It is noted that the bolster or frame member 10 is spring supported (not shown) in a conventional manner so that it deflects vertically when a load is imposed thereon as by loading the railway car, the deflection being proportional to the load imposed and the frame being adapted to return to its upper position by means of the spring support upon removal of the load. In order to insure the proper piston travel of the piston push rod 26 (FIG. 1), the actuation of the slack adjuster 60 (FIG. 3) is faster when the car is loaded as compared to the actuation when the car is empty. In operation as the weight of the car increases, the frame member 10 as well as the support 114 moves downwardly. Since the lever 108 cannot move downwardly because it is supported by an abutment 120 resting against the top of the brake beam 48, the ratio of the lever arm 117 with respect to the lever arm 119 is correspondingly reduced, thereby requiring a shorter travel of the brake beam 48 to actuate the trigger 106 of the slack adjuster 60. Conversely, when the weight of the car decreases the required travel of the brake beam for actuating the slack adjuster is increased.

As pointed out hereinbefore, the frame member 10 deflects vertically depending upon whether the railway car is loaded or empty. Since some members of the linkage are pivotally attached to the frame, they likewise will move vertically so that the effective lever arms will vary depending upon the position of the frame. FIG. 5 shows schematically the relationship between the various members when the railway car is empty and when it is loaded, the numerical indications being the same as those used hereinbefore for the corresponding elements.

In operation when the railway car is loaded, the brake force exerted against the brake shoes 102 and 104, and in turn, against the wheels 94 and 96, respectively, is increased as seen in FIG. 1. As pointed out hereinbefore, the piston travel (31, FIG. 4) is shorter when the car is loaded. Also, when the car is loaded, the frame 10 (FIG. 2) moves downwardly, thereby shortening the dimension between points 92 and 84, the dimension between points 66 and 58 (FIG. 5) being likewise shortened. At the same time the distance between points 66 and 38 (FIGS. 1 and 5) is increased as well as the distance between points 89 and 92 is also increased proportionally. The distance between points 66 and 42 (FIGS. 1 and 5) correspondingly decreases and the distance between the points 92 and 86 likewise decreases, the net result of which being an increase in the braking force, with respect to the empty car condition. Conversely, when the load in the car is reduced, the piston travel (FIGS. 4 and 5) is increased, and as seen in FIG. 5 the distances between points 92 and 84, between 66 and 58, between 66 and 38, and between 89 and 92 are all decreased while the distance between points 66 and 42, and 86 and 92 increase, thereby reducing the braking force.

As an example of one embodiment, the following numerical values will be given to the various forces and links to further illustrate the interrelationship of the elements. When the car is empty the piston rod 26 exerts a force of 1808 pounds and has a piston travel of 6½ inches. The distance between points 38 and 66, and between points 89 and 92 is 9½ inches. The distance between points 66 and 42, and between points 92 and 87 is 9½ inches. The distance between points 66 and 58 and between points 92 anl 84 is 10½ inches. The distance between points 58 and 62 and between points 84 and 72 is 8 inches. The compressive force exerted on the slack adjuster is 4,746 pounds. The resulting net force exerted by each brake beam 52 and 80 is 8,362 pounds.

When the car is loaded the piston rod 26 exerts a force of 2,905 pounds and has a piston travel of 4 inches. The distance between points 38 and 66, and between points 89 and 92 is 11 inches. The distance between points 66 and 42, and between points 92 and 87 is 8 inches. A distance between points 66 and 58, and between points 92 and 84 is 9¼ inches. The distance between points 58 and 62 and between points 84 and 87 remains at 8 inches. The compressive force exerted on the slack adjuster is 7,977 pounds. Resulting net force exerted by each brake beam 52 and 80 is 14,876 pounds.

In summary it will be appreciated that the lever-age ratios of the levers acting against the brake beams varies by changing the contact points 66 and 92 depending upon the load contained in the railway car, thereby causing a corresponding change in the applied braking forces. Secondly, the compound air piston cylinder assembly 14 (FIG. 1) produces a force, as transmitted by the piston rod 26, which is considerably greater for a loaded car as compared to an empty car. Thirdly, the slack adjuster 60 is actuated sooner and with less movement of the actuation linkage so that its effective operating length is thereby altered depending upon the railway car loading. Thus, it is seen that applicants have indeed provided a new and improved brake mechanism which effectively meets the objects specified hereinbefore.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. A brake mechanism for a railway car having a truck carrying a pair of wheels, said mechanism comprising a railway car truck frame member mounted for vertical movement, the vertical position being responsive to the load carried by said railway car, lever means mounted on said frame member, the leverage ratio being responsive to the vertical position of said frame member, a fluid cylinder, an outer piston sleeve mounted in said fluid cylinder, an inner piston mounted in said outer piston sleeve, a piston push rod carried by said inner piston, means for limiting the outer piston sleeve's operative travel with respect to the inner piston's operative travel, whereby said piston push rod has a first stroke and piston force when said railway car is empty and having a second stroke and force when said car is loaded, said lever means being actuated by said piston push rod, and a brake beam having portions which are selectively brought into frictional engagement with said pair of wheels, said lever means being operatively connected to said brake beam.

2. A brake mechanism for a railway car having a truck carrying a first and a second pair of wheels, said mechanism comprising a frame member mounted for vertical movement, the vertical position being responsive to the load carried by said railway car, piston means mounted on said frame member, a first brake beam having portions which are selectively brought into frictional engagement with said pair of wheels, a second brake beam having portions which are selectively brought into frictional engagement with said second pair of wheels, means operatively interconnecting said piston means with said first brake beam, slack adjusting means operatively connecting said first brake beam with said second brake beam, said slack adjusting means being automatically extensible and retractable for eliminating the slack and controlling the travel of the brake mechanism, said slack adjusting means being lockable in a rigid condition when transmitting the full braking force between said brake beams, a lever pivotally mounted on said frame member, means for restraining vertical movement of said lever when said frame member moves vertically, said first brake beam adapted to engage said lever, and trigger means mounted on said slack adjusting means for actuating said slack adjusting means in response to movement of said lever.

3. A brake mechanism for frictionally engaging wheels of a railway car comprising a frame member mounted for vertical movement, the vertical position being responsive to the load carried by said railway car, a fluid cylinder mounted on said frame member, piston means and a piston push rod actuated by said cylinder, a horizontal lever having one end pivotally mounted on said frame member and the other end thereof pivotally mounted on said piston rod, a brake beam having portions which are selectively brought into frictional engagement with said wheels, a truck live lever being centrally pivotally mounted on said brake beam, slack adjusting means, said slack adjusting means being automatically extensible and retractable for eliminating the slack and controlling the travel of the brake mechanism, said slack adjusting means being of the type that adjusts the slack on each stroke of operation, said slack adjusting means being lockable in a rigid condition while transmitting the full braking force to said brake beam, one end of said truck live lever being pivotally connected to one end of the slack adjusting means, and the other end of said truck live lever slidably engaging said horizontal lever at a contact point, the position of said contact point being responsive to the vertical position of said frame member, a lever pivotally mounted on said frame member, means for restraining vertical movement of said lever when said frame member moves vertically, said brake beam being adapted to engage said lever and thereby cause movement of said lever, trigger means mounted on the slack adjusting means for actuating said slack adjuster means in response to movement of said lever, whereby the piston means and piston push rod movement is maintained at preselected distances.

4. A brake mechanism for a railway car having a truck carrying a first and a second pair of wheels, said mechanism comprising a frame member mounted for vertical movement, the vertical position being responsive to the load carried by said railway car, a fluid cylinder mounted on said frame member, piston means and a piston push rod actuated by said cylinder, a horizontal lever having one end pivotally mounted on said frame member and the other end thereof pivotally mounted on said piston rod, a first brake beam having portions which are selectively brought into frictional engagement with said first pair of wheels, a truck live lever being centrally pivotally mounted on said brake beam, slack adjusting means having a first end and a second end, one end of said truck live lever being pivotally connected to the first end of the slack adjusting means, the other end of said truck live lever slidably engaging said horizontal lever at a contact point, the position of said contact point being responsive to the vertical position of said frame member, trigger means mounted on the slack adjusting means for actuating said slack adjusting means in response to movement of said brake beam, a second brake beam having portions which are selectively brought into frictional engagement with said second pair of wheels, a truck dead lever centrally pivotally mounted on said brake beam, said truck dead lever having one end thereof pivotally connected to the second end of said slack adjusting means, said slack adjusting means being automatically extensible and retractable for eliminating the slack and controlling the travel of the brake mechanism, said slack adjusting means being of the type that adjusts the slack on each stroke of operation, said slack adjusting means being lockable in a rigid condition when transmitting the full braking force between said brake beams, a horizontal dead lever fixedly attached to said frame member, and said truck dead lever having the other end thereof slidably engaging said horizontal dead lever at a second contact point for pivoting said truck dead lever to actuate said second brake beam, and the position of said second contact point being responsive to the vertical position of said frame member.

5. A brake mechanism for a railway car having a truck carrying a pair of wheels, said mechanism comprising a railway car truck frame member mounted for vertical movement, the vertical position being responsive to the load carried by said railway car, first lever means mounted on said frame member, a fluid cylinder, a piston push rod, and a compound piston mounted in said cylinder having a first stroke and piston force when said railway car is empty and having a second stroke and force when said car is loaded, said first lever means being actuated by said piston push rod, a brake beam having portions which are selectively brought into frictional engagement with said pair of wheels, said first lever means being operatively connected to said brake beam, slack adjusting means pivotally connected to said first lever means, means responsive to movement of said brake beam for actuating said slack adjusting means including a vertical lever having the lower end pivotally attached to said slack adjusting means and the other end thereof being provided with a vertically extending slot for receiving pin means for adjustably, pivotally interconnecting said lever and said frame member, said pin means being fixedly connected to said frame member and adapted for vertical movement within said slot, said vertical lever having a first projection thereon and a second projection thereon, said brake beam being engageable with said first projection for purposes of limiting the vertical travel of said vertical lever with respect to said frame member, and said brake beam being engageable with said second projection for causing movement of said slack adjusting means in response to movement of said brake beam.

6. A brake mechanism for a railway car having a truck carrying a first and a second pair of wheels, said mechanism comprising a railway car truck frame member mounted for vertical movement, the vertical position being responsive to the load carried by said railway car, a first lever having one end pivotally mounted on said frame member, motive means connected to the other end of said first lever, said motive means comprising a fluid cylinder, a piston push rod, and a compound piston mounted in said cylinder having a first stroke and piston force when said railway car is empty and having a second shorter stroke and larger force when said railway car is loaded, a first brake beam having portions which are selectively brought into frictional engagement with said first pair of wheels, a truck live lever pivotally mounted on said first brake beam, slack adjusting means, said slack adjusting means being extensible and retractable for eliminating the slack and controlling the travel of the brake mechanism, said slack adjusting means being lockable in a rigid condition, when transmitting the full braking force to said brake beam, said truck live lever being pivotally connected to one end of the slack adjusting means and slidably engages said first lever at a first contact point, the position of said first contact point being responsive to the vertical position of said frame member, said truck live lever having a first lever length extending from the first brake beam pivot point to said first contact point, said first lever having a second lever length extending from the motive means connection to said contact point, and said first lever having a third lever length extending from the frame member to said first contact point, a second brake beam having portions which are selectively brought into frictional engagement with said second pair of wheels, a truck dead lever medially pivotally mounted on said second brake beam, one end of said truck dead lever being pivotally connected to the other end of said slack adjusting means, a horizontal dead lever mounted on said frame member, the other end of said truck dead lever slidably engaging said horizontal dead lever at a second contact point, the position of said second contact point being responsive to the vertical position of said frame member, said truck dead lever having a fourth lever length extending from the second brake beam pivot point to said second contact point, said first, third, and fourth lever lengths being greater when said railway car is empty than when said railway car is loaded, and said second lever length being greater when said railway car is loaded than when said railway car is empty, means responsive to movement of said first brake beam for actuating said slack adjusting means, said last named means comprising a vertical lever having the lower end pivotally attached to said slack adjusting means and the other end thereof being provided with a vertically extending slot for receiving pin means for adjustably, pivotally interconnecting said lever and said frame member, said pin means being fixedly connected to said frame member and adapted for vertical movement within said slot, said lever having a first projection thereon and a second projection thereon, said brake beam being adapted to engage said first projection for purposes of limiting the vertical travel of said lever with respect to said frame member, and said brake beam being adapted to engage said second projection for actuating said slack adjusting means in response to movement of said brake beam, whereby the braking force transmitted to said brake beams is substantially greater when the railway car is loaded as compared to when the railway car is empty.

7. A brake mechanism for a railway car having a truck carrying a pair of wheels, said mechanism comprising a railway car truck frame, lever means mounted on said frame member, motive means for said lever means, a brake beam having portions which are selectively brought into frictional engagement with said pair of wheels, said lever means being operatively connected to said brake beam, slack adjusting means pivotally connected to said lever means, and means for automatically triggering said slack adjusting means at a rate of speed depending upon the loading condition of said railway car.

8. A brake mechanism for a railway car having a truck carrying a pair of wheels, said mechanism comprising a railway car truck frame, lever means mounted on said frame member, motive means for said lever means, a brake beam having portions which are selectively brought into frictional engagement with said pair of wheels, said lever means being operatively connected to said brake beam, slack adjusting means pivotally connected to said lever means, means for triggering said slack adjusting means at a plurality of preselected rates of speed, an actuating member, said last named means being actuated by said actuating member, the rate of speed being determined by the vertical position of said actuating member.

9. A brake mechanism for a railway car having a truck carrying a pair of wheels, said mechanism comprising a railway car truck frame member mounted for vertical movement, the vertical position being responsive to the load carried by said railway car, lever means mounted on said frame member, motive means for said lever means, a brake beam having portions which are selectively brought into frictional engagement with said pair of wheels, said lever means being operatively connected to said brake beam, slack adjusting means pivotally connected to said lever means, means for triggering said slack adjusting means at a plurality of preselected rates of speed, an actuating member, said actuating member being mounted on said truck frame member, said last named means being actuated by said actuating member, the rate of speed being determined by the vertical position of said actuating member.

10. A brake mechanism for a railway car having a truck carrying a pair of wheels, said mechanism comprising a railway car truck frame member mounted for vertical movement, the vertical position being responsive to the load carried by said railway car, lever means mounted on said frame member, motive means for said lever means, a brake beam having portions which are selectively brought into frictional engagement with said pair of wheels, said lever means being operatively connected to said brake beam, slack adjusting means pivotally connected to said lever means, and means responsive to movement of said brake beam for actuating said slack adjusting means, wherein said last named means comprises a vertical lever having the lower end pivotally to said slack adjusting means, an interconnecting member adjustably, pivotally interconnecting said lever and said frame member, said interconnecting member being fixedly connected to said frame member and adapted for vertical movement while in engagement with said vertical lever, said vertical lever having first means and spaced second means, said brake beam being adapted to engage said first means for purposes of limiting the vertical travel of said vertical lever with respect to said frame member, and said brake beam being adapted to engage said second means for causing movement of said slack adjusting means in response to movement of said brake beam.

11. A brake mechanism for a railway car having a truck carrying a pair of wheels, said mechanism comprising a railway car truck frame member mounted for vertical movement, the vertical position being responsive to the load carried by said railway car, lever means mounted on said frame member, motive means for said lever means, a brake beam having portions which are selectively brought into frictional engagement with said pair of wheels, said lever means being operatively connected to said brake beams, slack adjusting means pivotally connected to said lever means, and means responsive to movement of said brake beam for actuating said slack adjusting means, wherein said last named means comprises a vertical lever having the lower end pivotally attached to said slack adjusting means and the other end thereof being provided with a vertically extending slot for receiving pin means for adjustably, pivotally interconnecting said lever and said frame member, said pin means being fixedly connected to said frame member and adapted for vertical movement within said slot, said vertical lever having a first projection thereon and a second projection thereon, said brake beam being adapted to engage said first projection for purposes of limiting the vertical travel of said vertical lever with respect to said frame member, and said brake beam being adapted to engage said second projection for causing movement of said slack adjusting means in response to movement of said brake beam.

12. A brake mechanism for a railway car having a truck carrying a pair of wheels, said mechanism comprising a railway car truck frame member, lever means mounted on said frame member, a fluid cylinder, an outer piston sleeve mounted in said fluid cylinder, an inner piston mounted in said outer piston sleeve, a piston push rod carried by said inner piston, means for limiting the outer piston sleeve's operative travel with respect to the inner piston's operative travel, whereby said piston push rod has a first stroke and force when said railway car is empty and has a second stroke and force when said car is loaded, said lever means being actuated by said piston push rod, and a brake beam having portions which are selectively brought into frictional engagement with said pair of wheels, said lever means being operatively connected to said brake beam.

13. A brake mechanism for a railway car having a truck carrying a pair of wheels, said mechanism comprising a railway car truck frame member, lever means mounted on said frame member, a fluid cylinder, an outer piston sleeve mounted in said fluid cylinder, an inner piston mounted in said outer piston sleeve, a piston push rod carried by said inner piston, an abutment disposed on the inside of said fluid cylinder for limiting the outer piston sleeve's operative travel with respect to the inner piston's operative travel, whereby said piston push rod has a first stroke and piston force when said railway car is empty and has a second stroke and force when said car is loaded, a spring surmounted on said piston push rod for returning the outer piston sleeve and the inner piston to the bottoms of their respective strokes, said lever means being actuated by said piston push rod, and a brake beam having portions which are selectively brought into frictional engagement with said pair of wheels, said lever means being operatively connected to said brake beams.

14. A brake mechanism for a railway car having a truck carrying a pair of wheels, said mechanism comprising a railway car truck frame, lever means mounted on said frame member, a brake beam having portions which are selectively brought into frictional engagement with said pair of wheels, said lever means being operatively connected to said brake beam, slack adjusting means pivotally connected to said lever means, means for triggering said slack adjusting means at a rate of speed depending upon the loading condition of said railway car, at fluid cylinder mounted on said car frame, a piston push rod, a compound piston mounted in said cylinder having a plurality of successively longer strokes and a corresponding plurality of successively lower piston forces depending upon the rate of speed of said slack adjusting means, and said lever means being actuated by said piston push rod.

15. A brake mechanism for a railway car having a truck carrying a pair of wheels, said mechanism comprising a railway car truck frame, lever means mounted on said frame member, a brake beam having portions which are selectively brought into frictional engagement with said pair of wheels, said lever means being operatively connected to said brake beam, slack adjusting means pivotally connected to said lever means, and means for triggering said slack adjusting means at a rate of speed depending upon the loading condition of said railway car, a fluid cylinder mounted on said car frame, an outer piston sleeve mounted in said fluid cylinder, an inner piston mounted in said outer piston sleeve, a piston push rod carried by said inner piston, means for limiting the outer piston sleeve's operative travel with respect to the inner piston's operative travel, whereby said piston push rod has a first and a second stroke and piston force depending upon the triggered speed of said first slack adjusting means, and said lever means being actuated by said piston push rod.

16. A brake mechanism for a railway car having a truck carrying a pair of wheels, said mechanism comprising a railway car truck frame, lever means mounted on said frame member, a brake beam having portions which are selectively brought into frictional engagement with said pair of wheels, said lever means being operatively connected to said brake beam, slack adjusting means pivotally connected to said lever means, means for triggering said slack adjusting means at a plurality of preselected rates of speed, an actuating member, said last named means being actuated by said actuating member, the rate of speed being determined by the vertical position of said actuating member, a fluid cylinder mounted on said car frame, an outer piston sleeve mounted in said fluid cylinder, an inner piston mounted in said outer piston sleeve, a piston push rod carried by said inner piston, means for limiting the outer piston sleeve's operative travel with respect to the inner piston's operative travel, whereby said piston push rod has a first and a second stroke and piston force depending upon the triggered speed of said slack adjusting means, and said lever means being actuated by said piston push rod.

17. A brake mechanism for a railway car having a truck carrying a pair of wheels, said mechanism comprising a railway car truck frame member mounted for vertical movement, the vertical position being responsive to the load carried by said railway car, lever means mounted on said frame member, a brake beam having portions which are selectively brought into frictional engagement with said pair of wheels, said lever means being operatively connected to said brake beam, slack adjusting means pivotally connected to said lever means, means for triggering said slack adjusting means at a plurality of preselected rates of speed, an actuating member, said actuating member being mounted on said truck frame member, said last named means being actuated by said actuating member, the rate of speed being determined by the vertical position of said actuating member, a fluid cylinder mounted on said car frame, an outer piston sleeve mounted in said fluid cylinder, an inner piston mounted in said outer piston sleeve, a piston push rod carried by said inner piston, an abutment disposed on the inside of said fluid cylinder for limiting the outer piston sleeve's operative travel with respect to the inner piston's operative travel, whereby said piston push rod has a first stroke and piston force when said railway car is empty and has a second stroke and force when said car is loaded, said lever means being actuated by said piston push rod, a spring surmounted on said piston push rod for returning the outer piston sleeve and the inner piston to the bottoms of their respective strokes.

18. A brake mechanism for a railway car having a truck carrying a pair of wheels, said mechanism comprising a railway car truck frame member mounted for vertical movement, the vertical position being responsive to the load carried by said railway car, lever means mounted on said frame member, a brake beam having portions which are selectively brought into frictional engagement with said pair of wheels, said lever means being operatively connected to said brake beam, slack adjusting means pivotally connected to said lever means, and means responsive to movement of said brake beam for acauating said slack adjusting means, wherein said last named means comprises a vertical lever having the lower end pivotally attached to said slack adjusting means, an interconnecting member adjustably, pivotally interconnecting said lever and said frame member, said interconnecting member being fixedly connected to said frame member and adapted for vertical movement while in engagement with said vertical lever, said vertical lever having first means and spaced second means, said brake beam being adapted to engage said first means for purposes of limiting the vertical travel of said vertical lever with respect to said frame member, and said brake beam being adapted to engage said second means for causing movement of said slack adjusting means in response to movement of said brake beam, a fluid cylinder mounted on said car frame, a piston push rod, a compound piston mounted in said cylinder having a first and a second stroke and piston force depending upon the triggered speed of said slack adjusting means, and said lever means being actuated by said piston push rod.

19. A brake mechanism for a railway car having a truck carrying a pair of wheels, said mechanism comprising a railway car truck frame member mounted for vertical movement, the vertical position being responsive to the load carried by said railway car, lever means mounted on said frame member, a brake beam having portions which are selectively brought into frictional engagement with said pair of wheels, said lever means being operatively connected to said brake beam, slack adjusting means pivotally connected to said lever means, and means responsive to movement of said brake beam for actuating said slack adjusting means, wherein said last named means comprises a vertical lever having the lower end pivotally attached to said slack adjusting means and the other end thereof being provided with a vertically extending slot for receiving pin means for adjustably, pivotally interconnecting said lever and said frame member, said pin means being fixedly connected to said frame member and adapted for vertical movement within said slot, said vertical lever having a first projection thereon and a second projection thereon, said brake beam being adapted to engage said first projection for purposes of limiting the vertical travel of said vertical lever with respect to said frame member, and said brake being being adapted to engage said second projection for causing movement of said slack adjusting means in response to movement of said brake beam, a fluid cylinder mounted on said car truck frame member, an outer piston sleeve mounted in said fluid cylinder, an inner piston mounted in said outer piston sleeve, a piston push rod carried by said inner piston, means for limiting the outer piston sleeve's operative travel with respect to the inner piston's operative travel, whereby said piston push rod has a first stroke and force when said railway car is empty and has a second stroke and force when said car is loaded, said lever means being actuated by said piston push rod.

20. A brake mechanism for a railway car having a truck carrying a pair of wheels, said mechanism comprising a railway car truck frame member mounted for vertical movement, the vertical position being responsive to the load carried by said railway car, lever means mounted on said frame member, the leverage ratio being responsive to the vertical position of said frame member, a brake beam having portions which are selectively brought into frictional engagement with said pair of wheels, said lever means being operatively connected to said brake beam, slack adjusting means pivotally connected to said lever means, and means responsive to movement of said brake beam for actuating said slack adjusting means, wherein said last named means comprises a vertical lever having the lower end pivotally attached to said slack adjusting means and the other end thereof being provided with a vertically extending slot for receiving pin means for adjustably, pivotally interconnecting said lever and said frame member, said pin means being fixedly connected to said frame member and adapted for vertical movement within said slot, said vertical lever having a first projection thereon and a second projection thereon, said brake beam being adapted to engage said first projection for purposes of limiting the vertical travel of said vertical lever with respect to said frame member, and said brake beam being adapted to engage said second projection for causing movement of said slack adjusting means in response to movement of said brake beam, a fluid cylinder mounted on said car frame, an outer piston sleeve mounted in said fluid cylinder, an inner piston mounted in said outer piston sleeve, a piston push rod carried by said inner piston, an abutment disposed on the inside of said fluid cylinder for limiting the outer piston sleeve's operative travel with respect to the inner piston's operative travel, whereby said piston push rod has a first stroke and piston force when said railway car is empty and has a second stroke and force when said car is loaded, said lever means being actuated by said piston push rod, a spring surmounted on said piston push rod for returning the outer piston sleeve and the inner piston to the bottoms of their respective strokes.

21. A brake mechanism for a railway car having a truck carrying a pair of wheels, said mechanism comprising a railway car truck frame member mounted for vertical movement, the vertical position being responsive to the load carried by said railway car, lever means mounted on said frame member, the leverage ratio being responsive to the vertical position of said frame member, motive means for said lever means, a brake beam having portions which are selectively brought into frictional engagement with said pair of wheels, said lever means being operatively connected to said brake beam, slack adjusting means pivotally connected to said lever means, and means responsive to movement of said brake beam for actuating said slack adjusting means, wherein said last named means comprises a vertical lever having the lower end pivotally attached to said slack adjusting means and the other end thereof being provided with a vertically extending slot for receiving pin means for adjustably, pivotally interconnecting said lever and said frame member, said pin means being fixedly connected to said frame member and adapted for vertical movement within said slot, said vertical lever having a first projection thereon and a second projection thereon, said brake beam being adapted to engage said first projection for purposes of limiting the vertical travel of said vertical lever with respect to said frame member, and said brake beam being adapted to engage said second projection for causing movement of said slack adjusting means in response to movement of said brake beam.

References Cited

UNITED STATES PATENTS

| 1,817,081 | 8/1931 | Jonas. | |
| 2,702,612 | 2/1955 | Sudduth | 188—195 X |
| 3,266,601 | 8/1966 | Taylor | 188—52 |

DUANE A. REGER, *Primary Examiner.*

UNITED STATES PATENT OFFICE
CERTIFICATE OF CORRECTION

Patent No. 3,335,825                                          August 15, 1967

Everard C. Mersereau et al.

It is hereby certified that error appears in the above numbered patent requiring correction and that the said Letters Patent should read as corrected below.

Column 5, line 48, for "lever-age" read -- leverage --; column 9, line 42, after "pivotally" insert -- attached --; column 11, line 68, for "acauating" read -- actuating --; line 69, for "compirses" read -- comprises --.

Signed and sealed this 1st day of October 1968.

(SEAL)
Attest:

Edward M. Fletcher, Jr.                                EDWARD J. BRENNER
Attesting Officer                                             Commissioner of Patents